Patented Apr. 13, 1943

2,316,499

UNITED STATES PATENT OFFICE 2,316,499

TALL-OIL REFINING

Joseph N. Borglin, Wilmington, Del., assignor to Hercules Powder Company, Wilmington, Del., a corporation of Delaware No Drawing. Application August 16, 1941, Serial No. 407,247

16 Claims. (Cl. 260—97.5)

This invention relates to a method for the refining of tall-oil. More particularly, it relates to a method for refining tall-oil to remove metal salt impurities and visible and latent color bodies.

Tall-oil is a product derived from the manufacture of wood pulp by the soda method. As recovered from the waste liquor, it is dark in color, has an unpleasant odor and contains impurities which render it unfit for many commercial uses. In addition, the tall-oil as recovered from the waste liquor usually contains admixed solid matter of a heterogeneous nature along with small amounts of water. This solid matter is usually referred to as trash and can be removed by simple methods, as filtration, settling, etc. However, refining the crude material to improve the color has presented a perplexing problem. The color of tall-oil is very dark. This color is believed to be due in part to the presence of metal salts, especially iron salts, and in part to the presence of visible color bodies. The exact constitution or nature of these visible color bodies is unknown. Invisible or latent color bodies which develop color when the tall-oil is subjected to certain treatments, for example, saponification, also appear to be present.

It is an object of this invention to provide a method of refining tall-oil to improve its color.

It is another object to provide a method for removing objectionable metal salt impurities from tall-oil and particularly to provide a method for removing iron in the ferric form.

It is a further object to provide a method for removing visible and latent color bodies from tall-oil.

It is another object to provide a refined tall-oil having a substantially improved color.

A further object is to provide a refined tall-oil having a substantially improved odor.

Other objects will be apparent hereinafter.

The above objects are accomplished in accordance with this invention by subjecting crude tall-oil in liquid phase to treatment with an aqueous silicofluoride solution. While treatment with an aqueous silicofluoride solution will alone produce a refined tall-oil of improved color, it has been found most desirable to subject the tall-oil to a further treatment comprising contacting with an additional material having a capacity for absorbing color bodies therefrom. This additional treatment may be given prior to, simultaneous with, or subsequent to the treatment with the aqueous silicofluoride solution. Products having the lightest color, however, are obtained when the silicofluoride treatment precedes treatment with a material having a capacity of absorbing color bodies from the tall-oil.

In carrying out the processes of the invention, it will be desirable to first remove any solid matter and water from the tall-oil. Treatment with the aqueous silicofluoride solution will then be carried out with the tall-oil in liquid phase. Thus, liquid tall-oil itself or tall-oil dissolved in a suitable solvent therefor may be employed. Generally, any water-immiscible solvent for the tall-oil may be employed. Suitable solvents comprise petroleum solvents, as gasoline, petroleum ether, mineral spirits, etc.; aliphatic hydrocarbons, as liquefied propane, butane, pentane, etc.; aromatic hydrocarbons, as benzene, toluene, xylene, etc.; saturated cyclic hydrocarbons, as cyclohexane, p-menthane, decahydronaphthalene, etc.; terpenes, as dipentene, α-pinene, β-pinene, turpentine, etc.; and chlorinated hydrocarbons and ethers.

The aqueous silicofluoride solution employed will be an aqueous solution of an inorganic or organic silicofluoride which is at least partially soluble in water. Thus, inorganic silicofluorides, as sodium, potassium, ammonium, calcium, magnesium, hydrogen, titanium-potassium, lead silicofluorides, etc., and organic silicofluorides, as aniline silicofluoride, toluidine silicofluoride, etc., may be employed. The silicofluorides of sodium, potassium and ammonium are of preferred utility inasmuch as they are more soluble than the others. When silicofluorides of only slight solubility are employed, they may be used in the form of a suspension in the aqueous solution, if desired. Alternatively, a small amount of a water-miscible solvent which has greater solvency power for the silicofluoride than has water may be added to the aqueous solution to increase the solubility of the silicofluoride and thus enable better contact with the tall-oil. For example, dilute solutions of ethyl alcohol in water may be so employed.

In carrying out the treatment with an aqueous silicofluoride solution, the tall-oil in liquid phase will be contacted with an aqueous solution or suspension of a silicofluoride, as desired. The amount of silicofluoride employed, whether in the form of a solution or a suspension will vary depending upon the particular tall-oil being treated. However, generally between about 0.1% and about 25.0% by weight of the silicofluoride on the basis of the tall-oil will be employed. The concentration of silicofluoride in the aqueous solution is not critical, with the exception that in the case of the slightly soluble silicofluorides, saturated solutions are preferred. After contacting, the resulting admixture will be vigorously agitated, desirably at an elevated temperature, for example between about 40° C. and about 200° C., and preferably between about 60° C. and about 100° C. After thorough contact of the tall-oil with the silicofluoride has been established, the two immiscible phases will be separated. If a suspension of the silicofluoride has been employed in the process, the tall-oil phase will desirably be treated to remove any solid silicofluoride, as for example, by filtration. If desired, the tall-oil phase may also be water-washed to remove any entrained silicofluoride. Furthermore, when a silicofluoride solution is employed, the treatment may be carried out continuously by countercurrently contacting the tall-oil in liquid phase with the silicofluoride solution. The refined tall-oil resulting will be of improved color and substantially free of colored metal salt impurities.

Now, in accordance with the preferred embodiments of the invention, the tall-oil or solution thereof will be treated with a material which has a capacity for absorbing color bodies therefrom and which is capable of substantial immiscibility with the tall-oil or solution thereof. The term "absorbing" as used herein and in the claims includes both absorbing as by a solid, and dissolving and retaining as by a liquid, thus removing color bodies from the tall-oil or tall-oil solution, as the case may be. Suitable solid absorbents are, for example, activated carbon, activated alumina, synthetic aluminum and magnesium silicates, fuller's earth, absorbent clay, activated silica, activated bone black, etc. Reference to fuller's earth and other absorbent earths and silicates includes the earths per se or in an activated form, activated, for example, by treatment with an acid such as sulfuric, hydrochloric, etc. acids, and/or by calcination at temperatures of from 200 to 500° C. prior to use. Suitable liquid color body absorbing substances are, for example, furfural, furfuryl alcohol, a substantially immiscible chlorohydrin, as ethylene chlorohydrin, propylene chlorohydrin, etc., a phenol such as phenol, m-cresol, o-cresol, p-cresol, resorcinol, etc., usually liquefied by addition of water or a lower aliphatic alcohol, aniline, ethylene glycol, propylene glycol, butylene glycol, diethylene glycol, trimethylene glycol, glycerol, butyl glycerol, ethyl formate, methyl acetate, methyl formate, methyl orthonitrobenzoate, metyl furoate, allyl formate, monoacetin, diacetin, triacetin, ethylene glycol monoacetate, methanol, a hydroxyl alkyl amine, as triethanolamine, ethylene glycol monoethyl ether, or other immiscible glycol ether, ethylene glycol monoacetate, or other immiscible glycol ester, methyl thiocyanate, ethyl thiocyanate, acetonitrile, acetic acid, acetic anhydride, p-chloroaniline, resorcinol plus hydrosulfite, a boron compound, ethylene glycol diacetate, glycerol diacetate, resorcinol monoacetate, resorcinol diacetate, phenyl acetate, furfuryl acetate, ethylidine diacetate, n-propyl furoate, ethyl glycollate, methyl citrate, ethyl tartrate, ethyl malonate, methyl maleate, dimethyl phthalate, benzyl formate, monobutyrin, ethyl carbonate, methyl lactate, methyl adipate, hydroxyhydroquinone triacetate, methyl chlorocarbonate, propylene glycol monoacetate, hydroquinone diacetate, catechol monoacetate, guaiacyl acetate, methyl glutarate, benzyl acetate, diethyl glutacoate, ethyl lactate, diethyl phthalate, ethyl anisate, methyl salicylate, methyl cinnamate, methyl mandelate, methyl succinate, ethyl propiolate, ethyl acrylate, ethyl malate, methoxybenzaldehyde, guaiacol, anisidin, nitroanisol, dichloroethyl ether, methoxy acetic acid, methoxybenzyl alcohol, liquid sulfur dioxide, solutions of amphoteric metallic halides, nitroalcohols, nitromethane and other nitroparaffins, as well as mixtures of such refining agents which are chemically non-reactive, etc.

Treatment with a solid color body absorbent consists in suspending or agitating the absorbent in the tall-oil or solution thereof and then separating the absorbent with the absorbed color bodies from the liquid, or it may consist in passing the tall-oil in liquid phase through a mass of absorbent. The latter type of treatment is convenient as it combines contacting and separating in a single operation. In using liquid color body absorbents, the tall-oil in liquid phase and the absorbing liquid will be agitated together and then separated, as by decantation. Alternatively, the tall-oil phase and the liquid absorbent may be contacted in a continuous countercurrent extraction system.

Treatment of the tall-oil in liquid phase with either a solid or liquid color body absorbent will preferably be given at about 35° C. or therebelow, for example, between about 10° C. and about 35° C. When the silicofluoride treatment and the treatment with a selective color body absorbent are given simultaneously, it is usually preferable to contact the tall-oil in liquid phase at an elevated temperature as between about 60° C. and about 100° C. and then cool to about 35° C. or therebelow, as for example, between about 10° C. and about 35° C. to insure complete separation of the liquid color body absorbing material.

There follow several specific examples which, however, are not to be taken as limiting. All parts and percentages in this specification and claims are by weight unless otherwise indicated.

*Example 1*

Tall-oil, having a color of F on the rosin color scale, was dissolved in gasoline to give a 23.6% solution. Three hundred parts of this solution were washed with 100 parts of aqueous 2% sodium silicofluoride solution. To insure intimate contact, the admixed solutions were vigorously agitated at 60° C. for about 15 minutes. The tall-oil phase was separated and then given one wash with 52 parts of an aqueous 85% phenol solution at 25° C. This was followed by four washes with 17.5 parts each of aqueous 85% phenol solution at 25° C. Evaporation of the resulting refined gasoline solution yielded 49 parts of refined tall-oil, having a color grade of N on the rosin color scale. This corresponded with a yield of 65%. The odor of this refined product was much improved over that of the crude material. Upon saponification, the refined material yielded soaps having superior color to those prepared from crude tall-oil.

*Example 2*

Tall-oil, having a color somewhat darker than F on the rosin color scale, was dissolved in gasoline to give an 18% solution. Four hundred parts of this solution were washed with 150 parts of aqueous 3% potassium silicofluoride solution at 60° C. with vigorous agitation for 15 minutes. The mixture was then cooled to 25–30° C., and the tall-oil phase was separated. Thereafter, the tall-oil phase was given one wash with 30 parts of furfural at 20° C., which was followed by four consecutive washes with 15 parts each of furfural at 15° C. Evaporation of the resulting tall-oil solution gave 46 parts of tall-oil grading K on the rosin color scale and having a definitely improved odor. This amounted to a yield of 64%.

*Example 3*

Tall-oil, having a color grade of F on the rosin color scale, was dissolved in gasoline to give a 22% solution. Two hundred and fifty parts of this solution were vigorously shaken with a suspension consisting of 5 parts of calcium silicofluoride and 200 parts of water for a period of 15 minutes at 30° C. The aqueous phase was then separated, and the tall-oil solution filtered through 10 parts of filter-cel in order to remove traces of dispersed calcium silicofluoride as well as traces of water. The resulting tall-oil solution was then vigorously agitated with 35 parts of fuller's earth for a period of 3 hours at 25-30° C. The particular fuller's earth employed had been previously calcined at 400° C. for one-half hour and graded 80 mesh. The tall-oil solution was filtered from the fuller's earth. Evaporation of this resulting solution gave 40 parts of refined tall-oil grading K+ on the rosin color scale and having a definitely improved odor. This corresponded with a yield of 72%.

The application of the processes of the instant invention leads to the production of refined tall-oil having decidedly better color than that of the crude product. This refined product has a much more extended scope of utility. For example, light-colored soaps can be prepared with its use. The refining processes, in addition to removing colored impurities in the form of metal compounds, such as ferric compounds, are responsible for the removal of visible and latent color bodies. Furthermore, the use of selective absorbents for the color bodies in tall-oil is made more efficient when the preferred procedures as described hereinbefore are employed. Finally, the refined product has an improved odor.

It will be understood that the details and examples hereinbefore set forth are illustrative only and that the invention as broadly described and claimed is in no way limited thereby.

What I claim and desire to protect by Letters Patent is:

1. A process for refining crude tall-oil which comprises subjecting the tall-oil in liquid phase to the action of an aqueous silicofluoride solution, and recovering the refined tall-oil.

2. A process for refining crude tall-oil which comprises subjecting the tall-oil in liquid phase to the action of an aqueous silicofluoride solution, treating the tall-oil in liquid phase with a material having an additional capacity for absorbing color bodies therefrom, and recovering the refined tall-oil.

3. A process for refining crude tall-oil which comprises subjecting the tall-oil in liquid phase to the action of an aqueous potassium silicofluoride solution, and recovering the refined tall-oil.

4. A process for refining crude tall-oil which comprises subjecting the tall-oil in liquid phase to the action of an aqueous sodium silicofluoride solution, and recovering the refined tall-oil.

5. A process for refining crude tall-oil which comprises subjecting the tall-oil in liquid phase to the action of an aqueous calcium silicofluoride solution, and recovering the refined tall-oil.

6. A process for refining crude tall-oil which comprises subjecting the tall-oil in liquid phase to the action of an aqueous potassium silicofluoride solution, treating the tall-oil in liquid phase with a material having a capacity for absorbing color bodies therefrom, and recovering the refined tall-oil.

7. A process for refining crude tall-oil which comprises subjecting the tall-oil in liquid phase to the action of an aqueous sodium silicofluoride solution, treating the tall-oil in liquid phase with a material having a capacity for absorbing color bodies therefrom, and recovering the refined tall-oil.

8. A process for refining crude tall-oil which comprises subjecting the tall-oil in liquid phase to the action of an aqueous calcium silicofluoride solution, treating the tall-oil in liquid phase with a material having a capacity for absorbing color bodies therefrom, and recovering the refined tall-oil.

9. A process for refining crude tall-oil which comprises subjecting the tall-oil in liquid phase to the action of an aqueous potassium silicofluoride solution, subjecting the tall-oil in liquid phase to the action of an additional liquid having a capacity for absorbing color bodies therefrom, and recovering the refined tall-oil.

10. A process for refining crude tall-oil which comprises subjecting the tall-oil in liquid phase to the action of an aqueous sodium silicofluoride solution, subjecting the tall-oil in liquid phase to the action of an additional liquid having a capacity for absorbing color bodies therefrom, and recovering the refined tall-oil.

11. A process for refining crude tall-oil which comprises subjecting the tall-oil in liquid phase to the action of an aqueous calcium silicofluoride solution, subjecting the tall-oil in liquid phase to the action of an additional liquid having a capacity for absorbing color bodies therefrom, and recovering the refined tall-oil.

12. A process for refining crude tall-oil which comprises subjecting the tall-oil in liquid phase to the action of an aqueous potassium silicofluoride solution, subjecting the tall-oil in liquid phase to the action of furfural, and recovering the refined tall-oil.

13. A process for refining crude tall-oil which comprises subjecting the tall-oil in liquid phase to the action of an aqueous sodium silicofluoride solution, subjecting the tall-oil in liquid phase to the action of furfural, and recovering the refined tall-oil.

14. A process for refining crude tall-oil which comprises subjecting the tall-oil in liquid phase to the action of an aqueous calcium silicofluoride solution, subjecting the tall-oil in liquid phase to the action of furfural, and recovering the refined tall-oil.

15. A process for refining crude tall-oil which comprises simultaneously subjecting the tall-oil in liquid phase to the action of an aqueous silicofluoride solution and treating the tall-oil in liquid phase with an additional material having a capacity for absorbing color bodies therefrom, and thereafter recovering the refined tall-oil.

16. A process for refining crude tall-oil which comprises the steps of treating the tall-oil in liquid phase with a material having a capacity for absorbing color bodies therefrom, subjecting the tall-oil in liquid phase to the action of an aqueous silicofluoride solution, and recovering the refined tall-oil.

JOSEPH N. BORGLIN.